(12) United States Patent
Haag et al.

(10) Patent No.: US 10,971,777 B2
(45) Date of Patent: Apr. 6, 2021

(54) TRACTION BATTERY SUPPORT ASSEMBLY AND METHOD

(71) Applicant: Ford Global Technologies, LLC, Dearborn, MI (US)

(72) Inventors: Jeffrey Matthew Haag, Dearborn, MI (US); Eid Farha, Ypsilanti, MI (US); Lucas Amber, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 486 days.

(21) Appl. No.: 15/484,630

(22) Filed: Apr. 11, 2017

(65) Prior Publication Data

US 2018/0294450 A1   Oct. 11, 2018

(51) Int. Cl.
| | | |
|---|---|---|
| *H01M 50/20* | (2021.01) | |
| *B60L 50/64* | (2019.01) | |
| *B60L 50/60* | (2019.01) | |
| *B60K 1/04* | (2019.01) | |

(52) U.S. Cl.
CPC ............... *H01M 50/20* (2021.01); *B60K 1/04* (2013.01); *B60L 50/64* (2019.02); *B60L 50/66* (2019.02); *B60K 2001/0433* (2013.01); *B60K 2001/0466* (2013.01); *H01M 2220/20* (2013.01)

(58) Field of Classification Search
CPC ............. H01M 2/1077; H01M 2/0242; H01M 2/0245; H01M 2/1027
See application file for complete search history.

(56) References Cited

U.S. PATENT DOCUMENTS

| | | | |
|---|---|---|---|
| 9,543,556 B2 | 1/2017 | Boddakayala et al. | |
| 2008/0050645 A1* | 2/2008 | Kai | ..................... B60L 11/1861 429/61 |
| 2010/0247996 A1* | 9/2010 | Ijaz | .................. H01M 10/0468 429/120 |
| 2013/0136970 A1 | 5/2013 | Kurokawa et al. | |
| 2015/0249238 A1* | 9/2015 | Andre | ..................... B60K 1/04 429/99 |
| 2015/0255837 A1* | 9/2015 | Larsson | ............ H01M 10/6554 429/120 |

FOREIGN PATENT DOCUMENTS

WO     2006091655     8/2006

* cited by examiner

*Primary Examiner* — Miriam Stagg
*Assistant Examiner* — Lilia Nedialkova
(74) *Attorney, Agent, or Firm* — David Kelley, Esq.; Carlson, Gaskey & Olds, P.C.

(57) ABSTRACT

An exemplary support assembly includes a first housing that supports a first battery structure, a second housing that supports a second battery structure, a cover, and a common attachment that secures together the first housing, the second housing, and the cover. An exemplary support method includes securing together a first housing, a second housing, and a cover with a common attachment. The first housing supports a first battery structure that is enclosed by the second housing. The second housing supports a second battery structure that is enclosed by the cover.

5 Claims, 4 Drawing Sheets

TRACTION BATTERY SUPPORT ASSEMBLY AND METHOD

TECHNICAL FIELD

This disclosure relates generally to supporting battery structures of a traction battery and, more particularly to supporting battery structures that are arranged in tiers.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. The traction battery can include an enclosure, for example, that houses and supports the battery arrays.

Referring to prior art FIG. 1, a known traction battery 2 includes a platform 4 supported on a floor of an enclosure tray 6 and secured separately from an enclosure cover 8. The floor directly supports a lower tier battery array. The platform 4 directly supports an upper tier battery array. Packaging space is required for securing the platform 4 and separate packaging space is required for securing the enclosure cover 8.

SUMMARY

A support assembly according to an exemplary aspect of the present disclosure includes, among other things, a first housing that supports a first battery structure, a second housing that supports a second battery structure, and a cover. A common attachment secures together the first housing, the second housing, and the cover.

In a further non-limiting embodiment of the foregoing assembly, the cover encloses the second battery structure within the second housing and the second housing encloses the first battery structure within the first housing.

In a further non-limiting embodiment of any of the foregoing assemblies, the first battery structure and the second housing are at least partially disposed within an open area provided by the first housing.

In a further non-limiting embodiment of any of the foregoing assemblies, the second housing nests within the first housing.

In a further non-limiting embodiment of any of the foregoing assemblies, the first housing is a tub having providing an open area that receives the battery structure, and the second battery structure is disposed outside the open area.

In a further non-limiting embodiment of any of the foregoing assemblies, the first housing is a first tub with a first depth, and the second housing is a second tub with a second depth less than the first depth. The first and second tubs each have a floor and sidewalls extending transversely from the floor. The sidewalls of the first housing are laterally spaced from the sidewalls of the second housing. The floor of the first housing is vertically spaced from the floor of the second housing.

In a further non-limiting embodiment of any of the foregoing assemblies, the common attachment comprises the cover being secured to both a lip of the first housing and a lip of the second housing.

In a further non-limiting embodiment of any of the foregoing assemblies, the lip of the second housing is sandwiched between the lip of the first housing and the cover.

In a further non-limiting embodiment of any of the foregoing assemblies, the common attachment comprises at least one mechanical fastener joining together a portion of the cover, a portion of the first housing, and a portion of the second housing.

In a further non-limiting embodiment of any of the foregoing assemblies, the first housing is a first tray and the second housing is a second tray.

In a further non-limiting embodiment of any of the foregoing assemblies, all portions of the first battery structure are vertically misaligned with the second battery structure.

In a further non-limiting embodiment of any of the foregoing assemblies, the first and the second battery structures are separate battery arrays of an electrified vehicle.

A support method according to an exemplary aspect of the present disclosure includes, among other things, securing together a first housing, a second housing, and a cover with a common attachment. The first housing supports a first battery structure that is enclosed by the second housing. The second housing supports a second battery structure that is enclosed by the cover.

A further non-limiting embodiment of the foregoing method includes nesting the second housing at least partially within an open area of the first housing.

A further non-limiting embodiment of any of the foregoing methods includes attaching the cover to both a lip of the first housing and a lip of the second housing during the securing.

A further non-limiting embodiment of any of the foregoing methods includes sandwiching the lip of the second housing between the lip of the first housing and the cover during the securing.

A further non-limiting embodiment of any of the foregoing methods includes, during the securing, using a mechanical fastener to join together a portion of the cover, a portion of the first housing, and a portion of the second housing.

In a further non-limiting embodiment of any of the foregoing methods, the first battery structure is part of a first tier, and the second battery is part of a second tier vertically displaced from the first tier.

In a further non-limiting embodiment of any of the foregoing methods, the first tier is vertically below the second tier.

In a further non-limiting embodiment of any of the foregoing methods, the first and the second battery structures are separate battery arrays of an electrified vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to supporting and securing battery structures arranged in tiers. A common attachment is used to secure more than one housing along with a cover. The common attachment can, among other things, reduce a packaging footprint required for a traction battery.

Figure 1:
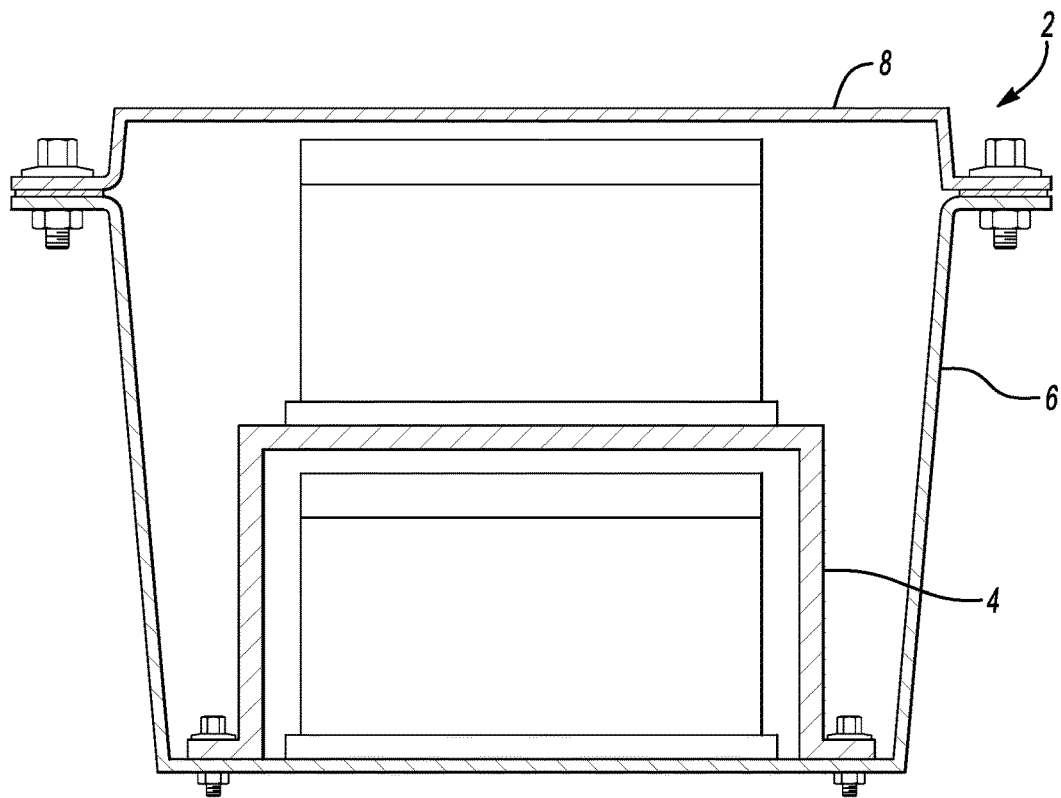
FIG. 1 illustrates a prior art traction battery pack in section.
Figure 2:
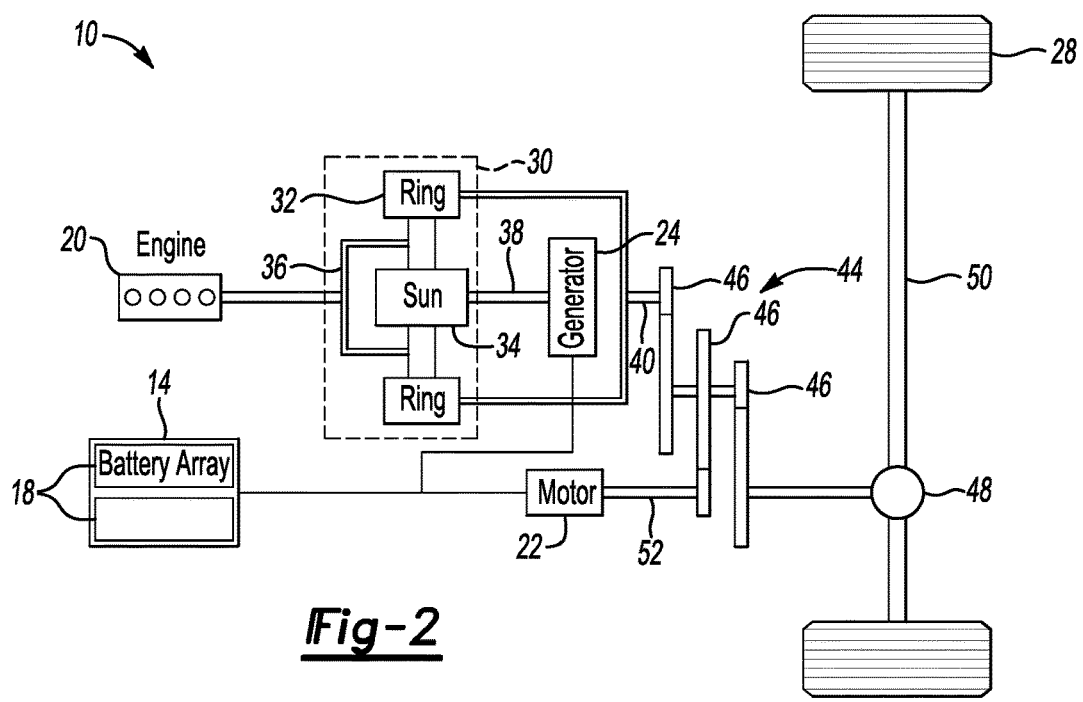
FIG. 2 illustrates a schematic view of an exemplary powertrain for an electrified vehicle.

Referring to FIG. 2, a powertrain 10 for a hybrid electric vehicle (HEV) includes a traction battery 14 having a plurality of battery arrays 18. Although depicted as being used with the HEV, it should be understood that the concepts described herein are not limited to the traction batteries of HEVs and could extend to the traction batteries of other types of electrified vehicles, including, but not limited to, plug-in hybrid electric vehicles (PHEVs), battery electric vehicles (BEVs), fuel cell vehicles, etc.

In addition to the traction battery 14, the powertrain 10 includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 3:
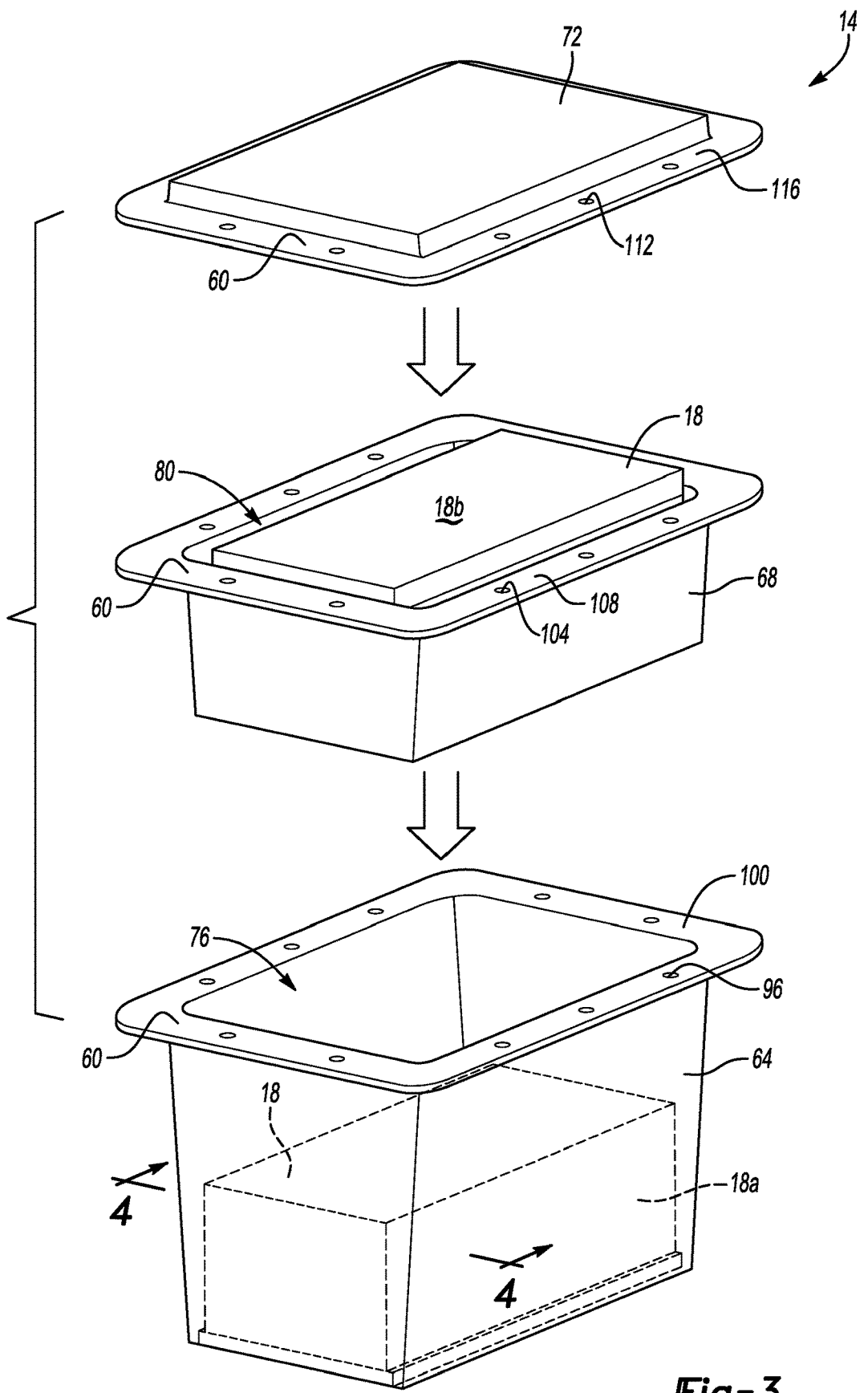
FIG. 3 illustrates an expanded view of a traction battery for use in the powertrain of FIG. 2 according to an exemplary embodiment of the present disclosure.
Figure 4:
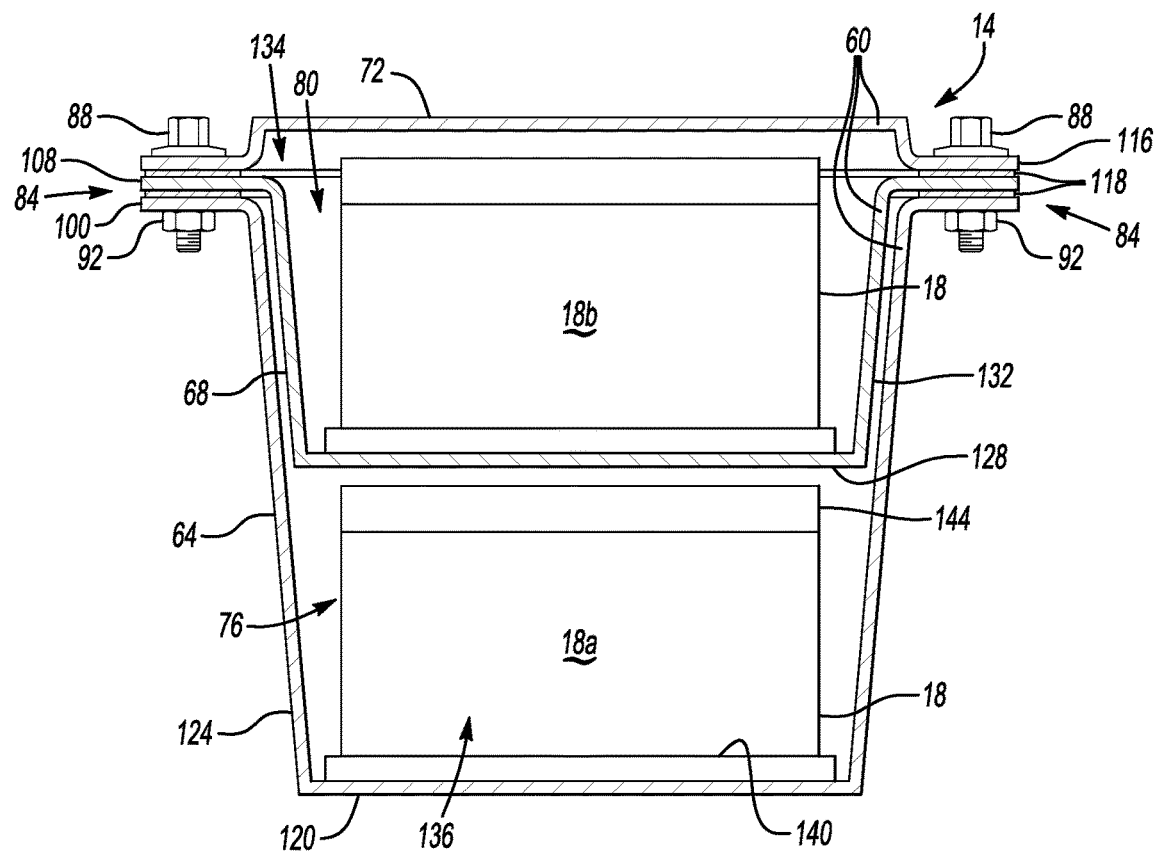
FIG. 4 illustrates a section view of the traction battery taken at line 4-4 in FIG. 3 when the traction battery is assembled.

Referring now to FIGS. 3 and 4, the traction battery 14 includes an enclosure 60 that houses the battery structures, such as the battery arrays 18. The enclosure 60 can instead or additionally enclose other battery structures, such as electronics associated with the traction battery 14. The enclosure 60 is a type of support assembly for the battery arrays 18 and other battery structures. Battery structures should not be considered limited to the battery arrays 18.

The enclosure 60 includes a first housing 64, a second housing 68, and a cover 72. One or more of the first housing 64, the second housing 68, and the cover 72 can be stamped or cast from a metal or metal alloy material, extruded or molded from a polymer based material, or made of some other material or combination of materials. Various passages can be formed in the enclosure 60 to provide electrical connections to the remaining portions of the vehicle and the battery arrays 18.

The traction battery 14, with the enclosure 60, can be mounted to a vehicle incorporating the powertrain 10 of FIG. 2. The traction battery 14 can be mounted to various areas of the vehicle, including areas outside a passenger cabin of the vehicle, such as the underbody, and areas within the vehicle, such as beneath a rear seat. The enclosure 60, among other things, protects the battery arrays 18 from environmental contaminants and corrosion.

The first housing 64 supports the battery array 18a within an open area 76. The second housing 68 supports the battery array 18b within an open area 80. In another example, electronics are supported by the second housing 68 instead of the battery array 18b. That is, the first housing 64 could support a battery array and the second housing could support electronics but no battery array, or vice versa.

The second housing 68 nests within the first housing 64. The nesting of the second housing 68 within the first housing 64 can enclose the battery array 18a within the open area 76. The cover 72 can enclose the battery array 18b within the open area 80.

The battery arrays 18 are arranged in tiers within the traction battery 14. In this example, the battery array 18a is vertically lower than the battery array 18b within the traction battery 14. More specifically, in this example, all portions of the battery array 18a are vertically misaligned from portions of the battery array 18b. Vertical, for purposes of this disclosure, is with reference to the horizon or ground and the typical position of the vehicle during operation.

The battery arrays 18 are shown as arranged within two tiers—one upper tier and one lower tier. In other examples, the traction battery 14 could include more than two tiers of battery arrays 18.

In this example, the first housing 64, the second housing 68, and the cover 72 are secured together with at least one common attachment 84. In this example, the common attachments 84 are each provided by a mechanical fastener, such as a bolt 88 and a nut 92, that clamp together the first housing 64, the second housing 68, and the cover 72. In another example, the at least one common attachment 84 is provided by an adhesive, clips, welding, or some combination of these. Any type of attachment could be utilized and this disclosure should not be considered limiting to the specific attachments described herein.

The bolt 88 extends through an aperture 96 within a lip 100 of the first housing 64, an aperture 104 within a lip 108 of the second housing 68, and through an aperture 112 within a lip 116 of the cover 72. When the bolt 88 fully engages the nut 92, the lip 108 of the second housing 68 is substantially sandwiched between the lip 116 of the cover 72 and the lip 100 of the first housing 64.

The example traction battery 14 utilizes eight common attachments 84. The common attachments 84 are distributed about a periphery of the open areas 76 and 80.

For purposes of this disclosure, the common attachments 84 are considered common because the common attachments 84 are shared by cover 72, the first housing 64 and the second housing 68. Using the common attachments 84 permits securing the first housing 64, the second housing 68, and the cover 72 together without requiring separate securing structures. Thus, overall part complexity of the traction battery 14 is reduced. Further, allocating packaging space for an attachment of, for example, the second housing 68 to the first housing 64 separate from the common attachment is not required.

Seal structures 118 can be positioned between the lip 100 and the lip 108, as well as between the lip 108 and the lip 116. The seal structures 118 can inhibit movements of contaminants, for example, through the interfaces between the lips 100, 108, 116. The seal structures 118 could be foam based, rubber based, or based on some other material.

In this example, the bolt 88 extends through the seal structures 118 such that some of the seal structure is outboard the bolt 88 and some of the seal structure 118 is inboard the bolt 88. In other examples, the seal structures 118 can be entirely outboard the bolt 88, or entirely inboard the bolt 88.

Generally, in this example, the first housing 64 and the second housing 68 are trays of the enclosure 60 that have a tub-like configuration. The first housing 64 includes, for example, a floor 120, and a plurality of walls 124 extending at any angle transversely from the floor 120. The battery array 18a is disposed on the floor 120. Bolts, or other fasteners, could be used to secure the battery array 18a to the floor 120.

The second housing 68 includes a floor 128 and a plurality of walls 132 extending at any angle transversely from a periphery of the floor 128. The battery array 18b is disposed on the floor 128. Bolts, or other fasteners, could be used to secure the battery array 18b to the floor 128.

The first housing 64 has a depth that generally corresponds to a height of the walls 124, and the second housing 68 has a depth that generally corresponds to the height of the walls 132. In this example, the depth of the first housing 64 is about twice that of the depth of the second housing 68.

Although the majority of the battery array 18b is housed within the open area 80 of the second housing 68, some of the battery array 18b extends past the lip 108 into an open area 134 provide by the cover 72. In another example, no portion of the battery array 18b extends into an open area provided by the cover 72 such that the battery array 18b is housed entirely within the open area 80 of the second housing 68.

The arrays 18a and 18b are constructed similarly to each other. Each of the battery arrays 18a and 18b includes a plurality of battery cells 136 disposed along an axis and upon a thermal exchange plate 140. A bus bar 144 can engage terminals (not shown) along sides of the battery cells 136. Here, the bus bar 144 engages terminals along upwardly facing sides of the battery cells 136. End plates (not shown) could compress the battery cells 136 axially. The arrays 18a and 18b could also include sidewalls or other structures that hold together the cells and electrically isolate various areas of the battery arrays 18a and 18b.

The mechanical fasteners securing the battery arrays 18a and 18b to the respective floors 120 and 128 can, in some examples, extend through the respective thermal exchange plate 140 to engage the respective floor 120 or 128.

If the traction battery 14 includes more than two tiers of battery arrays 18, the battery pack could include additional housings to support the additionally tiers. The additional housings could nest within the open area 80 of the second housing 68, for example.

Figure 5:
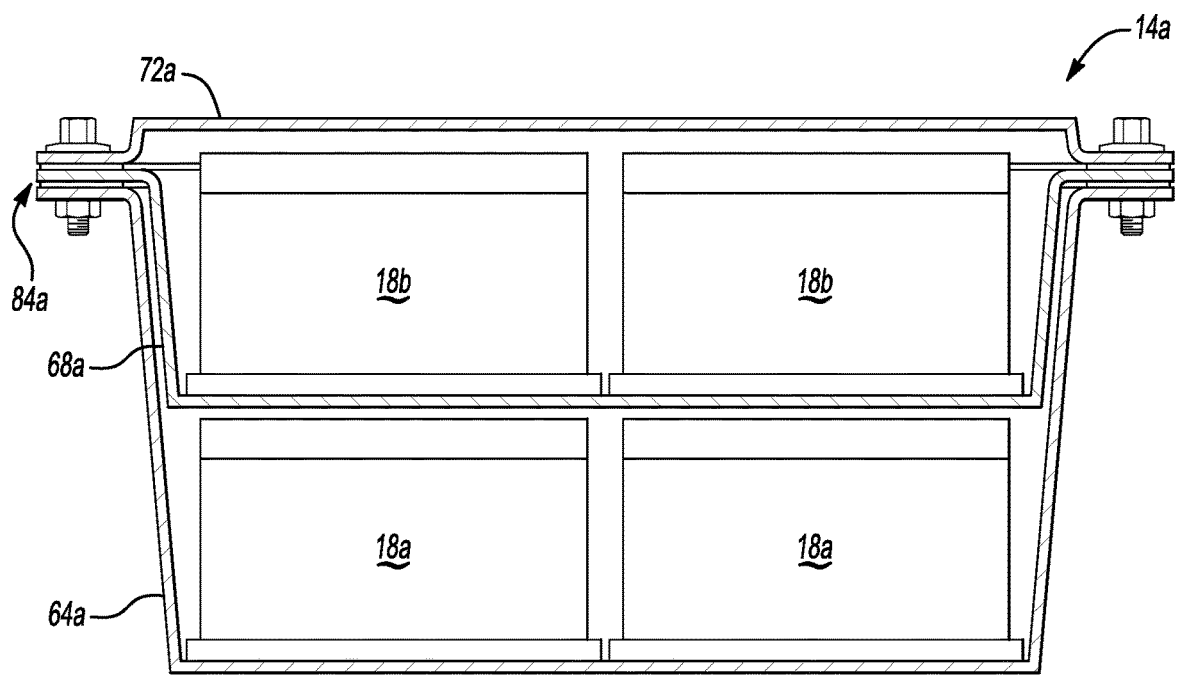
FIG. 5 illustrates a section view of a traction battery according to another exemplary embodiment.

Referring now to FIG. 5, a traction battery 14a according to another exemplary embodiment includes a first housing 64a, a second housing 68a, and cover 72a. The second housing 68a nests within the first housing 64a to enclose an open area provided by the second housing 68a. The cover 72a encloses an open area of the second housing 68a.

The first housing 64a supports a plurality of battery arrays 18a within a first, lower tier. The second housing 68a supports a plurality of battery arrays 18b within a second, upper tier that is above the first tier.

The first housing 64a, the second housing 68a, and the cover 72a are joined by at least one common attachment 84a. Thus, as shown, the common attachment 84a can be utilized in traction batteries having more than one battery array on a tier.

Figure 6:
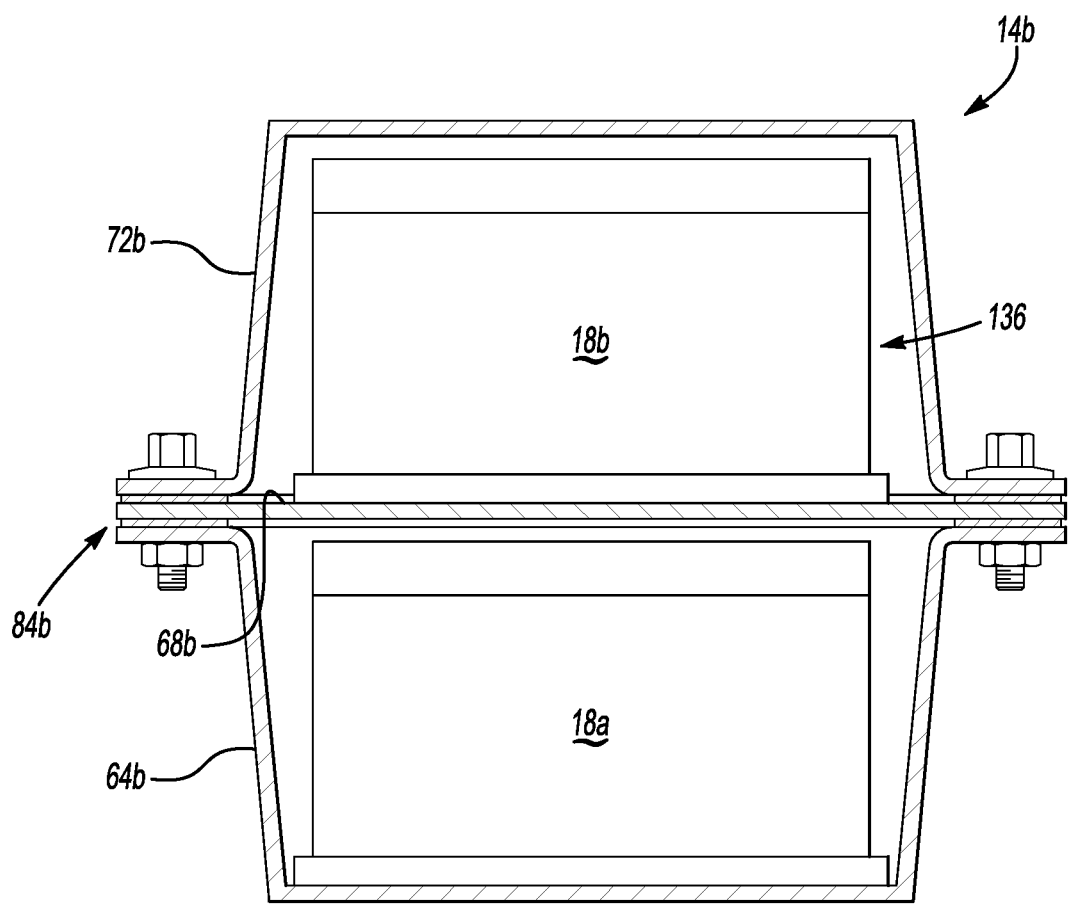
FIG. 6 illustrates a section view of a traction battery according to yet another exemplary embodiment.

Referring now to FIG. 6, an exemplary traction battery 14b according to yet another exemplary embodiment includes a first housing 64b, a second housing 68b, and a cover 72b all joined via common attachment 84b. The first housing 64b supports at least one battery array 18a of a first, lower tier, and the second housing 68b supports at least one battery array 18b on a second, upper tier.

The first housing 64b provides an open area that receives the at least one battery array 18a. The second housing 68b is generally planar and, in this example, provides no open area for receiving the at least one battery array 18b. Instead, the cover 72b provides an open area 136 to accommodate the at least one battery array 18b.

Nesting, for purposes of this disclosure, refers to housings that fit within one another. The traction battery 14 of FIG. 4 and the traction battery 14a of FIG. 5 demonstrate examples of housings that nest. The traction battery 14b of FIG. 6, in contrast, demonstrates an example of a housing that does not nest.

Features of the disclosed examples include a traction battery incorporating tiers of battery arrays while maintaining a relatively small footprint for fastening the battery arrays to the various structures. Stacking the battery arrays in tiers can reduce the volume and density of the traction battery.

Since separate fasteners are not required to secure the second housings and the cover, assembly time may be reduced, as well as the overall weight of the battery pack. Further, the floor of the first housing directly supports only the lower tier of battery arrays, rather than both the lower and upper tier. The mass of the first housing can thus be reduced.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A support assembly, comprising:
   a first tub having a floor that supports at least one first battery structure;
   a second tub having a floor that supports at least one second battery structure and encloses the at least one first battery structure within the first tub, the second tub at least partially nested within the first tub such that the floor of the second tub is spaced a distance from the at least one first battery structure;
   a cover that encloses the at least one second battery structure within the first tub; and
   at least one common attachment that secures together the first tub, the second tub, and the cover, wherein the floor of the second tub directly supports the at least one second battery structure without directly supporting any portion of the at least one first battery structure.

2. The support assembly of claim 1, wherein the floor of the second tub is detached from the at least one first battery structure.

3. The support assembly of claim 1, wherein the at least one first battery structure and the second tub are at least partially disposed within an open area provided by the first tub.

4. The support assembly of claim 1, wherein the at least one common attachment comprises at least one mechanical fastener joining together a lip of the cover, a lip of the first tub, and a lip of the second tub such that the lip of the second tub is sandwiched between the lips of the cover and the first tub.

5. The support assembly of claim 1, wherein all portions of the floor of the second tub are spaced a distance from the at least one first battery structure to provide a continuous open area between the floor of the second tub and the at least one first battery structure.

\* \* \* \* \*